United States Patent
Hong et al.

(10) Patent No.: US 8,886,117 B1
(45) Date of Patent: Nov. 11, 2014

(54) THROUGH-THE-EARTH (TTE) COMMUNICATION SYSTEMS AND METHODS

(75) Inventors: Yang-Ki Hong, Tuscaloosa, AL (US); Seok Bae, Ansan (KR)

(73) Assignee: The Board of Trustees of the University of Alabama for and on behalf of The University of Alabama, Tuscaloosa, AL (US)

( * ) Notice: Subject to any disclaimer, the term of this patent is extended or adjusted under 35 U.S.C. 154(b) by 428 days.

(21) Appl. No.: 13/043,249

(22) Filed: Mar. 8, 2011

Related U.S. Application Data

(60) Provisional application No. 61/311,633, filed on Mar. 8, 2010.

(51) Int. Cl.
  *H04B 13/02* (2006.01)

(52) U.S. Cl.
  CPC ........................... *H04B 13/02* (2013.01)
  USPC ............................. 455/40; 343/788

(58) Field of Classification Search
  USPC ........................................................ 367/131
  See application file for complete search history.

(56) References Cited

U.S. PATENT DOCUMENTS

| | | | |
|---|---|---|---|
| 3,815,124 A * | 6/1974 | Brewer | 341/160 |
| 4,623,838 A * | 11/1986 | Nakamura | 324/142 |
| 4,849,692 A * | 7/1989 | Blood | 324/207.26 |
| 7,149,472 B2 | 12/2006 | Reagor et al. | |
| 7,843,768 B2 | 11/2010 | Squire et al. | |
| 2004/0253944 A1 * | 12/2004 | Kelley et al. | 455/418 |
| 2005/0079818 A1 * | 4/2005 | Atwater et al. | 455/41.2 |
| 2006/0286931 A1 * | 12/2006 | Rhodes et al. | 455/40 |
| 2009/0245025 A1 * | 10/2009 | Rhodes et al. | 367/134 |
| 2009/0322640 A1 * | 12/2009 | LeVan | 343/788 |
| 2010/0311325 A1 | 12/2010 | Marshall | |

FOREIGN PATENT DOCUMENTS

RU  2158368 C1 * 10/2000

OTHER PUBLICATIONS

Yarkan, et al., "Underground Mine Communications: A Survey," IEEE Communication Surveys and Tutorials, vol. 11, No. 3, Third Quarter 2009.

* cited by examiner

*Primary Examiner* — Isam Alsomiri
*Assistant Examiner* — Hovhannes Baghdasaryan
(74) *Attorney, Agent, or Firm* — Maynard, Cooper & Gale, P.C.; Jon E. Holland

(57) ABSTRACT

A through-the-earth (TTE) communication system has a transmitter that uses an electromagnetic antenna to propagate a magnetic communication signal through the earth. The antenna comprises a coil that is wrapped a core of magnetic material. The transmitter converts voice into a pulsed direct current (DC) signal that is applied to the coil of the antenna. The antenna transforms the pulsed DC signal into a pulsed DC magnetic field that propagates through the earth, and the DC magnetic field may pass through soil, water, or other substances within the earth. A receiver at the earth's surface or other location senses the pulsed magnetic field and converts the sensed magnetic energy into a voice signal.

7 Claims, 3 Drawing Sheets

THROUGH-THE-EARTH (TTE) COMMUNICATION SYSTEMS AND METHODS

CROSS REFERENCE TO RELATED APPLICATION

This application claims priority to U.S. Provisional Patent Application No. 61/311,633, entitled "Through-the-Earth (TTE) Communication Systems and Methods" and filed on Mar. 8, 2010, which is incorporated herein by reference.

RELATED ART

Annually several thousand miners are killed by mining disasters in the world. In order to increase the number of survivors, it has been assessed that the rapid determination of the miners' position and status is one of the most important factors for rescue, and many emergency communication systems have been developed.

Some such communication systems employ a cable for propagating communication signals between underground miners and personnel on the earth's surface. However, the cable can become entangled and hamper mining operations. In addition, to propagate signals across large distances, line amplifiers and repeaters are typically needed. Such components require power and usually employ a battery backup for operation when the power fails, thereby increasing maintenance costs. Further, the cable is susceptible to damage in a disaster situation, such as a cave-in.

Due to the drawbacks of a cable-based communication system, a wireless communication system would generally be preferred. However, wireless signals generated by conventional through-the-earth (TTE) communication systems experience significant attenuation as they pass through the earth limiting the effective range of such systems. Some TTE communication systems have been tested to allow effective communication of depths of up to about 300 feet. Unfortunately, many mine shafts extend underground to depths much greater than 300 feet.

Thus, a heretofore unaddressed need exists in the art for communication systems that can be used to wirelessly communicate through-the-earth at distances greater than those achieved by conventional TTE communication systems.

BRIEF DESCRIPTION OF THE DRAWINGS

The disclosure can be better understood with reference to the following drawings.

The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to through-the-earth (TTE) communication systems and methods. One exemplary embodiment of a TTE communication system has a transmitter that uses an electromagnetic antenna to propagate a magnetic communication signal through the earth. The antenna comprises a coil that is wrapped around a core of magnetic material. The transmitter converts voice into a pulsed direct current (DC) signal that is applied to the coil of the antenna. The antenna transforms the pulsed DC signal into a pulsed DC magnetic field that propagates through the earth, and the DC magnetic field may pass through soil, water, or other substances within the earth. A receiver at the earth's surface or other location senses the pulsed magnetic field and converts the sensed magnetic energy into a voice signal.

Figure 1:
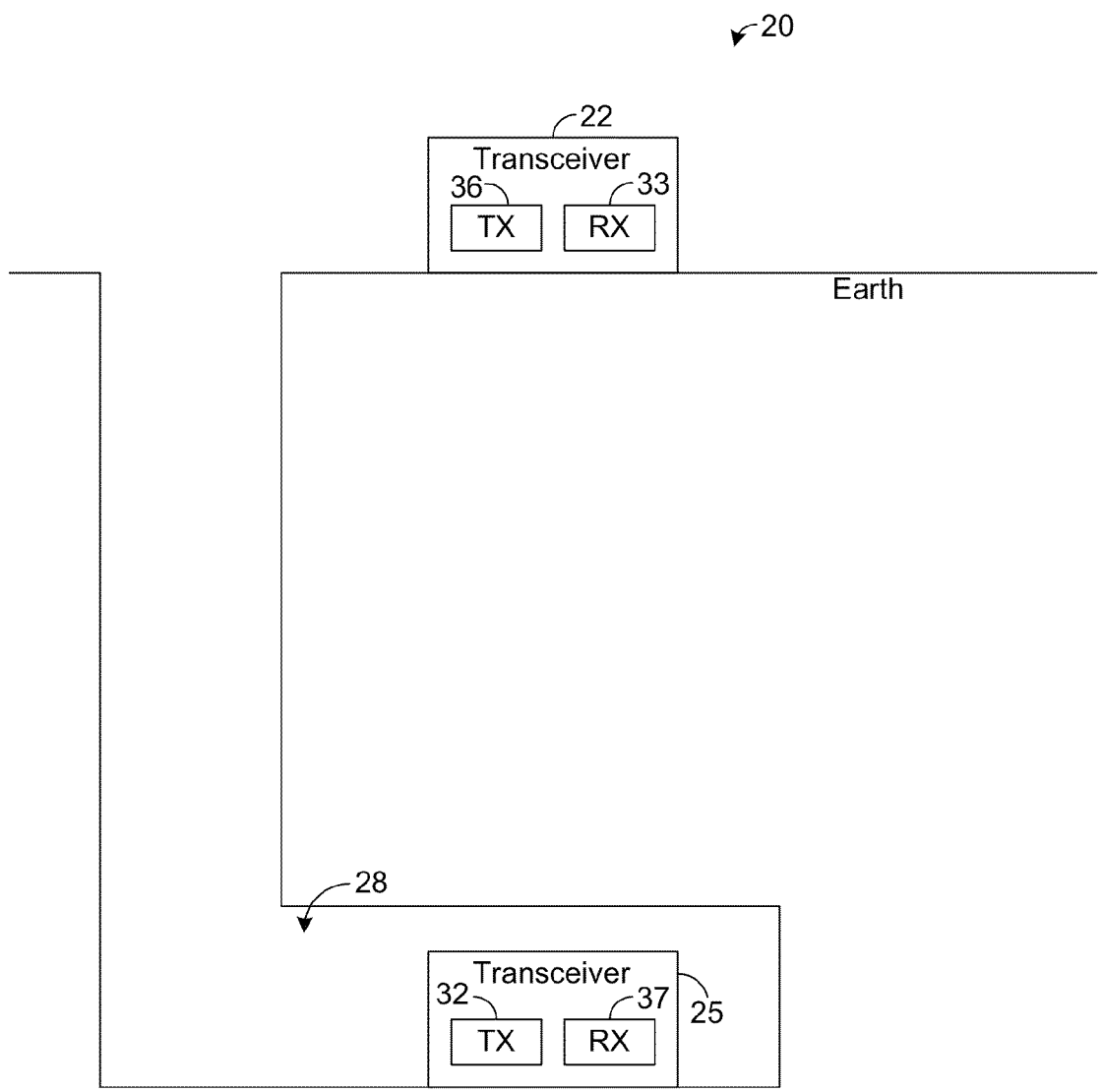
FIG. 1 is a block diagram illustrating an exemplary embodiment of a through-the-earth communication system.

FIG. 1 depicts an exemplary embodiment of a TTE communication system 20. The system comprises a transceiver 22 that is located on a surface of the earth. Another transceiver 25 is positioned underground, such as in a shaft of an underground mine 28, and the transceivers 22, 25 are configured to wirelessly communicate with each other via magnetic signals, as will be described in more detail hereafter. Thus, the transceiver 25 can be used by miners or other users in the mine 28 to communicate with users of the transceiver 22 on the earth's surface. In other embodiments, the transceivers 22, 25 may be positioned at other locations.

As shown by FIG. 1, the transceiver 25 has a transmitter 32 that senses sounds, such as a user's voice, and converts the sounds to a magnetic signal that is wirelessly transmitted from the transmitter 32 to a receiver 33 of the transceiver 22. The receiver 33 converts the magnetic signal back into the sounds that were previously sensed by the transmitter 32. Thus, words spoken into the transmitter 32 by a user of the transceiver 25 are regenerated by the receiver 33 and can be heard by a user of the transceiver 22.

Similarly, the transceiver 22 has a transmitter 36 that senses sounds, such as a user's voice, and converts the sounds to magnetic signals that are wirelessly transmitted from the transmitter 36 to a receiver 37 of the transceiver 25. The receiver 37 converts the magnetic signals back into the sounds that were previously sensed by the transmitter 36. Thus, words spoken into the transmitter 36 by a user of the transceiver 22 are regenerated by the receiver 37 and can be heard by a user of the transceiver 25.

Figure 2:
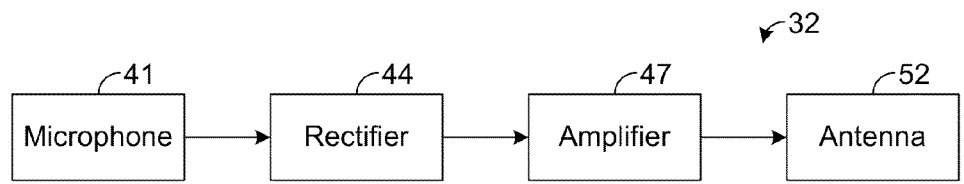
FIG. 2 is a block diagram illustrating an exemplary embodiment of a transmitter for a TTE communication system, such as is depicted by FIG. 1.

FIG. 2 depicts an exemplary embodiment of the transmitter 32. The transmitter 32 comprises a microphone 41 that is coupled to a rectifier 44, an amplifier 46, and an antenna 52, as shown by FIG. 2. The microphone 41 senses sounds and converts the sounds to an electrical signal, which is rectified by the rectifier 44 thereby providing a pulsed DC signal. The pulse DC signal is amplified by the amplifier 47 and is applied to the terminals of the antenna 52.

Figure 3:
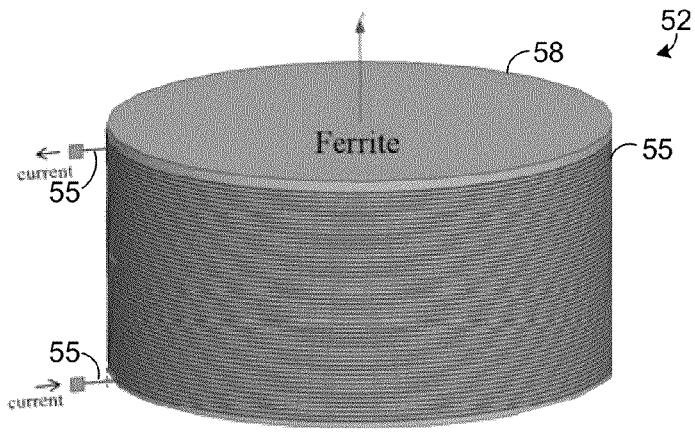
FIG. 3 is a diagram illustrating an exemplary embodiment of an antenna for a transmitter of a TTE communication system, such as is depicted by FIG. 2.

As shown by FIG. 3 the antenna 52 comprises a coil 55 that is wrapped around a core 58 of magnetic material. The coil 55 is composed of conductive material, such as copper, and has a plurality of turns around the magnetic core 58. In one exemplary embodiment, the coil 55 has two-hundred (200) turns, and the pulsed DC signal passing through the coil 55 has a current of about one (1) Ampere (A), a voltage of about 1 Volt (V), and a frequency of about 1 kilo-Hertz (kHz). In addition, the core 58 is composed of a manganese-zinc (Mn—Zn) ferrite having a permeability of about 10,000 and a ferrite weight of about 11.445 kilograms (kg). Further, the core 58 is in the shape of a cylinder with a width of about 180 millimeters (mm) and a height of about 90 mm, and the core 58 has a volume of about 2289 centimeters$^3$ (cm$^3$). In other embodiments, other configurations of the antenna 52 are possible. For example, the core 58 may have other shapes and sizes, and the coil 55 may have other numbers of turns. In addition, the core 58 may be composed of other types of magnetic material, and other levels of current may be applied to the coil 55.

Note, specifically, that various frequency ranges are possible. Preferably a range of about 1 kHz to about 5 kHz is used for the communication. Other frequencies are possible, but magnetic signals generally become more attenuated at higher frequency thereby decreasing the range of penetration through terrain. Keeping the frequency at around 5 kHz or less helps to keep the penetration distance within acceptable ranges for many applications.

The current passing through the coil 55 interacts with the magnetic flux of the core 58 to provide a pulsed magnetic field corresponding to the pulsed DC signal. Such magnetic field passes through the earth and is sensed by the receiver 33 (FIG. 1).

Figure 4:
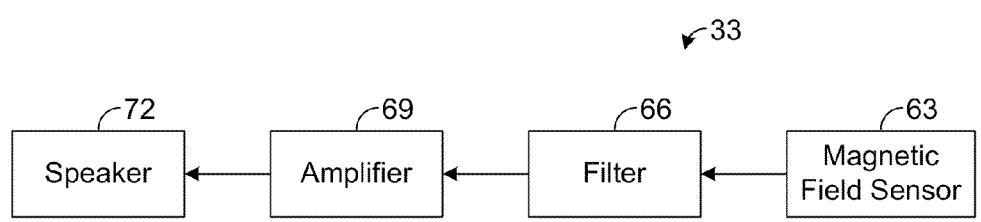
FIG. 4 is block diagram illustrating an exemplary embodiment of a receiver for a TTE communication system, such as is depicted by FIG. 1.

FIG. 4 depicts an exemplary embodiment of the receiver 33. The receiver 33 comprises a magnetic field sensor 63 that is coupled to a filter 66, an amplifier 69, and a speaker 72, as shown by FIG. 4. The magnetic field sensor 63 is configured to sense the magnetic field generated by the antenna 52 of the transmitter 32. The magnetic field sensor 63 is configured to transmit an electrical signal, referred to herein as a "sensor signal," indicative of the strength of the pulsed magnetic field sensed by the sensor 63. The sensor signal has pulses corresponding to those of the sensed magnetic field and is filtered by the filter 66. The amplifier 69 amplifies the filtered signal, and a speaker 72 converts the amplified signal into sound. Thus, a user at the speaker 72 can hear a verbal message spoken by a user at the microphone 41 (FIG. 2) of the transmitter 32.

The transmission of the magnetic signal from the transmitter 32 to the receiver 33 can be interfered by ferromagnetic elements or molecules but is generally not significantly interfered by the presence of water and metal in soil. Thus, the range of communication enabled by the TTE communication system 20 is much greater than that enabled by conventional TTE communication systems, particularly in locations having a relatively small presence of ferromagnetic elements. In one exemplary embodiment using the antenna 52 shown by FIG. 3, the range of communication through the earth is at least about 1 kilometer (km).

Further, it should be noted that positioning the coil 55 in close proximity to and around the magnetic core 58 generally increases the efficiency of interaction between the electrical field of the current and the magnetic flux of the core 58, thereby improving the range of communication. However, in other embodiments, communication may be achieved without positioning a coil 55 around the magnetic core 58. For example, a coil or other type of conductive wire may be placed in close proximity to the core 58 such that the electrical field of the current interacts with the magnetic flux of the core 58 without turning the coil or wire around the core 58.

Note that the transmitter 36 may be configured identical or similar to the transmitter 32 described above, and the receiver 37 may be configured identical or similar to the receiver 33 described above. Thus, the same techniques used to communicate messages from the transmitter 32 to the receiver 33 may be employed to communicate messages from the transmitter 36 to the receiver 37.

An exemplary operation and use of the communication system 20 will now be described with particular reference to FIG. 5.

For illustrative purposes, assume that a user at the transceiver 25 wishes to convey a verbal message to a user at the transceiver 22. The user at the transceiver 25 speaks the verbal message within range of the microphone 41. As the user speaks, the transmitter 32 converts the user's voice to a pulsed DC signal, as shown by block 91 of FIG. 5. As shown by block 94, this current signal is applied to the coil 55 of the antenna 52, which transforms the signal into a pulsed magnetic field that wirelessly propagates through the earth to the transceiver 22.

Figure 5:
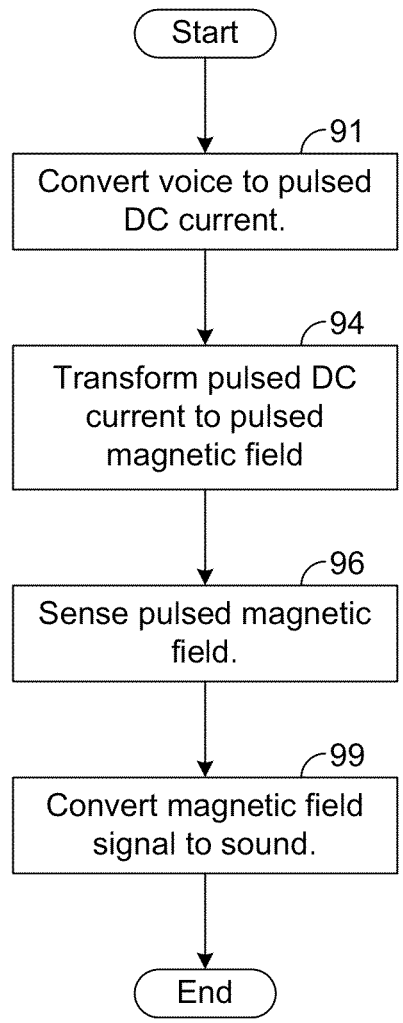
FIG. 5 is a flow chart illustrating an exemplary method of communicating a message in a TTE communication system, such as is depicted by FIG. 1.

The magnetic field sensor 72 of the receiver 33 senses the pulsed magnetic field generated by the antenna 52, as shown by block 96 of FIG. 5, and the receiver 33 converts the pulsed magnetic field to sound, as shown by block 99 of FIG. 5 thereby regenerating the verbal message spoken by the user at the transceiver 25. Thus, the user at the transceiver 22 can hear the verbal message spoken by the user at the transceiver 25. If desired, the user at the transceiver 22 may convey a verbal message via similar techniques from the transmitter 36 to the receiver 37.

It should be noted that various embodiments described above have been described as transmitting magnetic signals through soil and other types of terrain. However, the communication system 20 may be used to communicate in other environments and/or through other types of substances. As an example, the transceiver 25 may be positioned underwater (e.g., in a submarine) and communicate with a transceiver 22, which may be positioned underground, underwater, on land, or above the earth's surface. For example, the transceiver 22 may be positioned on a ship, raft, or other vessel on a surface of the water in which the transceiver 25 is located. Such a system 20 enables two-way communication through water. In another example, a transceiver 22 is coupled to a miner's hat and used for communication. In one exemplary embodiment, transceivers are coupled to the hats of various miners to enable miner-to-miner communication. In yet other embodiments, other environments for the communication system 20 are possible.

Now, therefore, the following is claimed:

1. A through-the-earth (TTE) communication system, comprising:
    a transmitter positioned underground and having an antenna, the antenna having a magnetic core and a coil passing around the magnetic core, the transmitter configured to convert sound to a pulsed direct current (DC) signal and to apply the pulsed DC signal to the coil such that the antenna generates a pulsed magnetic field corresponding to the pulsed DC signal; and
    a receiver having a magnetic field sensor configured to sense the magnetic field and provide a sensor signal based on the sensed magnetic field, the receiver configured to convert the sensor signal to sound,
    wherein the transmitter and the receiver are positioned such that the magnetic field sensed by the magnetic field sensor passes through soil as the magnetic field propagates from the transmitter to the receiver.

2. The TTE communication system of claim 1, wherein the transmitter has a microphone, and wherein the coil is electrically coupled to the microphone.

3. The TTE communication system of claim 1, wherein the transmitter has microphone for converting the sound to an electrical signal, and wherein the transmitter has a rectifier for converting the electrical signal into the pulsed DC signal for transmission by the antenna.

4. A through-the-earth communication method, comprising the steps of:
- positioning a transmitter underground;
- converting sounds to a pulsed direct current (DC) signal via the transmitter;
- transforming the pulsed DC signal to a pulsed magnetic field via an antenna of the transmitter, wherein the antenna has a magnetic core and a coil passing around the magnetic core;
- sensing the pulsed magnetic field after the pulsed magnetic field passes through soil;
- transforming the pulsed magnetic field to an electrical signal; and
- converting the electrical signal to sound.

5. A communication method, comprising the steps of:
- converting sound into a pulsed direct current (DC) signal;
- applying the pulsed DC signal to a coil of an antenna, the coil passing around a magnetic core of the antenna;
- transforming the pulsed DC signal to a magnetic signal via the antenna;
- sensing the magnetic signal, wherein the magnetic signal sensed by the sensing step passes through soil prior to the sensing step;
- transforming the magnetic signal to an electrical signal; and
- converting the electrical signal to sound.

6. The method of claim 5, wherein the transmitter is positioned underground when the pulsed DC signal is transformed to the magnetic signal.

7. The method of claim 5, wherein the receiver is positioned underground during the sensing step.

\* \* \* \* \*